(No Model.) 2 Sheets—Sheet 1.
F. W. HEDGELAND.
PNEUMATIC ACTION FOR ORGANS.
No. 488,607. Patented Dec. 27, 1892.
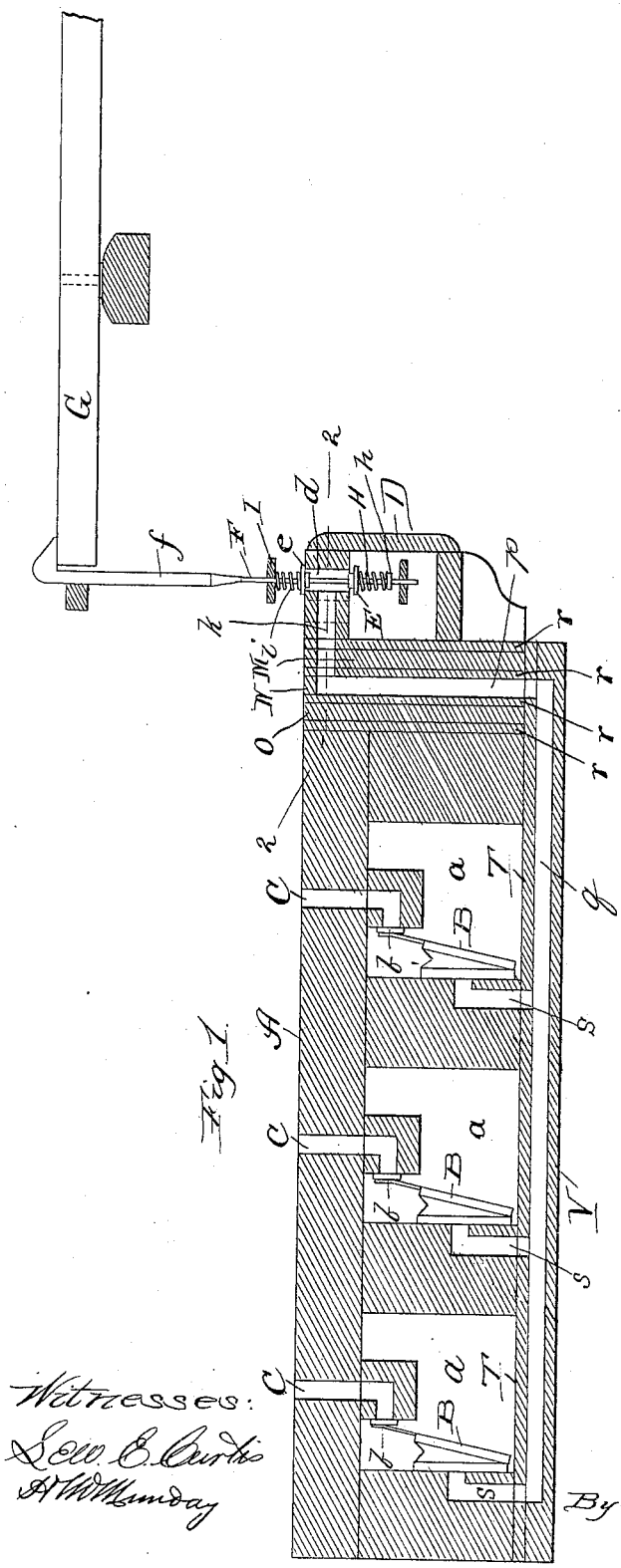
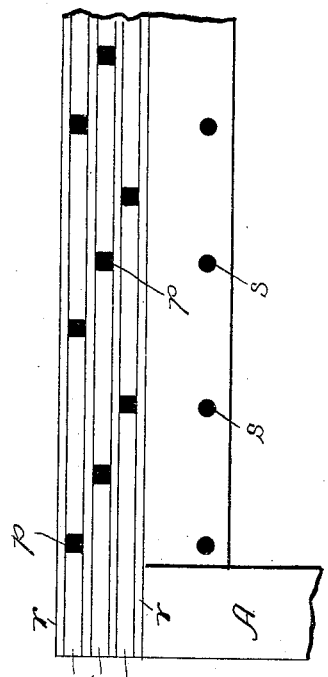
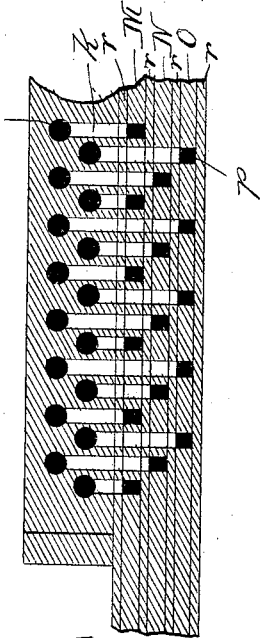
Witnesses:
Inventor:
Frederick W. Hedgeland.
By Munday Evarts & Adcock
His Attorneys.

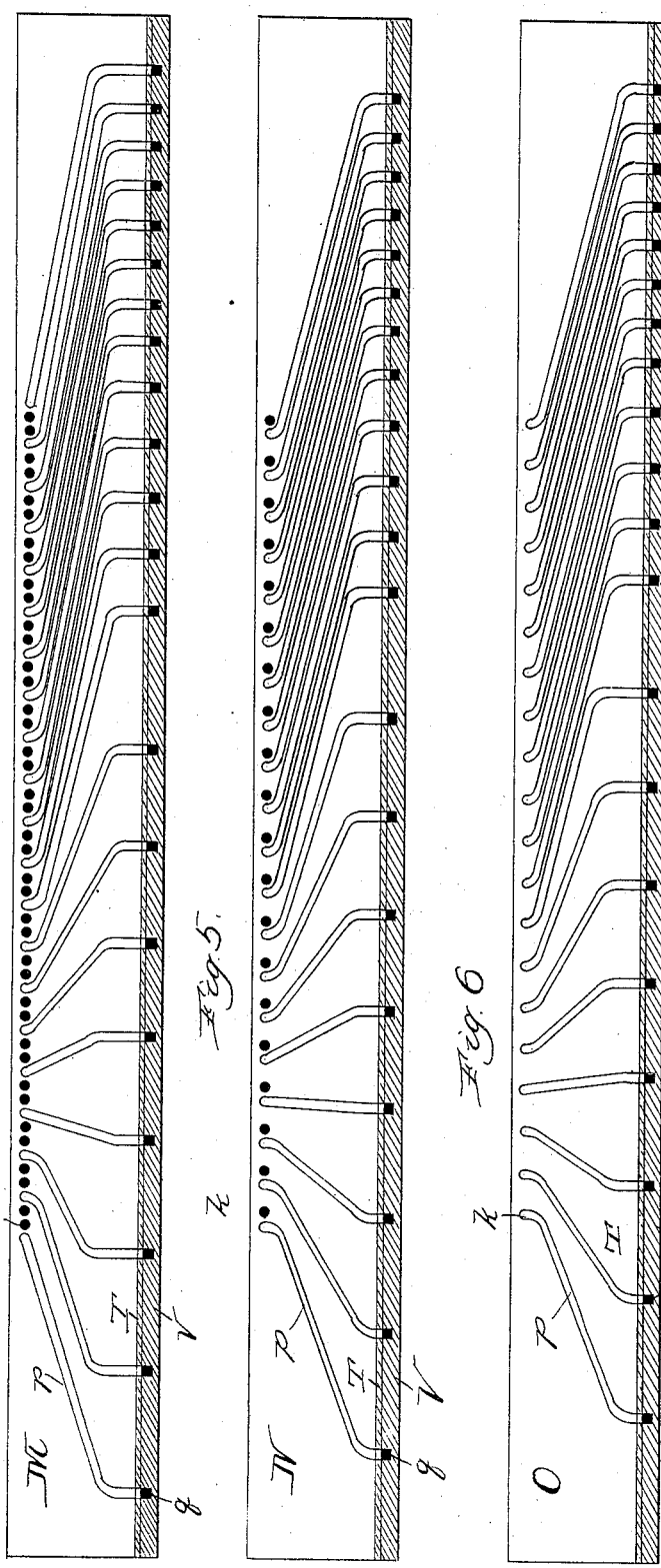

UNITED STATES PATENT OFFICE.

FREDERICK W. HEDGELAND, OF CHICAGO, ILLINOIS.

PNEUMATIC ACTION FOR ORGANS.

SPECIFICATION forming part of Letters Patent No. 488,607, dated December 27, 1892.

Application filed December 21, 1891. Serial No. 415,700. (No model.)

*To all whom it may concern:*

Be it known that I, FREDERICK W. HEDGELAND, a citizen of the United States, residing at Chicago, in the county of Cook and State of Illinois, have invented a new and useful Improvement in Pneumatic Actions for Organs, of which the following is a specification.

My main object in this invention has been to devise a form of action whereby the pipes of an organ can be sounded and which is operated by the striking of the keys or pedals, and which is so compact as to be well adapted to use in the smaller class of pipe organs. The economy of room occupied by the action is important of course in all sizes of organs and hence my invention is of benefit in large as well as small instruments, though it was originally devised for the purpose of so reducing the size of small pipe organs as to render them portable, thus enabling the manufacturer to put the instrument together at the factory ready for use and to ship it in boxes for long distances without taking it apart.

The nature of my improvement will be understood from the description which I give below and from the accompanying drawings in which latter Figure 1 is a vertical transverse section of the wind chest, pallet box and their connecting passages; Fig. 2 is a partial section on the line 2—2 of Fig. 1; Fig. 3 is a partial bottom view of the wind chest with the bottom board removed, and Figs. 4, 5 and 6 are detail vertical sections of the parts of the channel board connecting the pallet box and the wind chest.

In the drawings A represents the wind chest provided with the usual wind chambers $a$, each chamber serving for the pipes of some particular stop. Each chamber also contains a series of small bellows B, commonly called pneumatics, carrying the valves $b$ controlling the passages C by which the pipes are fed when sounded from the wind chambers.

D is the pallet box which is normally charged with air and preferably at a pressure exceeding that in the wind chambers as described in an application filed by me on the 23d day of November 1891 as Serial No. 412,742. At the openings $d$ leading from the pallet box into the channel board connecting the box with the pneumatics of the wind chest are the double disk valves E $e$ mounted upon the stem F attached to the tracker $f$ actuated by the key or pedal G, each key or pedal having a like tracker and valve. The valves E are normally open so that the pressure in the pallet box is normally present in the passages leading from the pallet box to the several pneumatics, and the valves $e$ which are normally closed are adapted to relieve this pressure when opened. Between the valve E and the collar $h$ upon the stem F is a spring H which when the tracker and stem are raised by the key is compressed but which as soon as the key is released draws the disk back to its normal position. The disk E is permitted a sliding movement upon the stem so that it may be positioned in close proximity to its seat at the opening $d$ and thus serve to close said opening at the commencement of the stroke of the key and still allow the stem F to move upward after the disk has become fully seated. Between the disk $e$ and a guide bar I is another spring $i$ bearing downward upon the disk $e$ and serving, by reason of said disk being fast upon the stem, to return the disk, stem and tracker to their normal position upon the release of the key. The construction of this valve is fully set forth in my previous application, and I lay no claim thereto in this case. Of course it will be understood that each key and pedal is provided with a like tracker and valve adapted to be operated by it when struck.

Between the wind chest and pallet box is located a channel board connecting the manual scale of the pallet box with the scale of the wind chest. This channel board I make in three sections M N and O placed vertically side by side so as to form a very compact structure and also placed alongside of the wind chest as illustrated at Fig. 1. The pallet box for further economy of room is also placed directly alongside the channel board. Each section of the channel board is provided with a series of channels $p$ connecting the ducts $k$, leading from the several valve openings $d$, with the valve ways $q$ of the wind chest, the latter connecting with the pneumatics by passage $s\ s$, thus enabling the maintenance of the normal pressure of the pallet box in the pneumatics. The passages $p$ radiate as it will be seen from their connections with the ducts $k$ to their openings in the valve ways $q$.

The construction of the sectional channel board is somewhat novel. Each section of the board connects the pallets and the pneumatics of a different set of keys from those connected by the other sections. My purpose in this is to avoid lengthening the board and any spreading of the disk valves which are conveniently and alternately disposed in two adjacent rows, as shown in Fig. 2. The passages $k$ for the channels $p$ of the section O, which is farthest away from the pallet box, must be cut entirely through the sections M and N and those for the passages $p$ of the second section must likewise be cut through the section M. In the construction of the sections of the channel board I take a plank of sufficient thickness and lay out the passages $p$ and then saw the board through along the side lines of the passages and remove the material from between the lines of sawing. I then glue to each flat side of the channeled board a thin piece of wood $r$ of the same size as the one in which the channels are formed, thus completing such channels. I next cut through the surface board the openings $k$ wherever necessary, and secure the three sections together side by side with the openings $k$ in alignment, so far as that is requisite. The surface boards $r$ need not be duplicated in the case of the center section as the surface boards of the outer sections serve to complete the channels of said center section. The channels $p$ open through the bottom of the board which is covered, except at the mouths of the several channels, by the same board T which forms the bottom of the wind chambers $a$, and below this board is placed the bottom board V in which are the valve ways $q$.

My channel board is exceedingly compact, economical in construction and avoids most of the sharp angles heretofore employed in connecting the pallet box and wind chest, and it not only economizes the amount of room required but it renders the action very quick and avoids friction upon the air employed in working it.

The pallet box being built upon the key scale, the divergence necessary in the channels $p$ to widen this scale to that of the wind chest is considerable, and hence I employ the sectional board illustrated where economy of space is desirable. Room for all the channels may however be obtained in the single section M by widening that section as is obvious.

I claim:—

1. In an organ, the combination with the pallet box and wind chest, of a channel board, as M, having passages formed therein and connecting the box with the chest, said box and chest being located side by side with the channel board between them, substantially as specified.

2. In an organ, the combination with the pallet box and the wind chest of a vertical channel board connecting the box with the chest, the parts all being relatively arranged as set forth.

3. The combination of the wind chest and channel board placed side by side, as shown, and provided with a bottom T, common to both the chest and board, substantially as specified.

4. The combination of the wind chest and channel board placed side by side, as shown, and provided with a bottom T and a valve way bottom V, both extended under the chest and board and forming the passages connecting the passages of the channel board with the pneumatics of the wind chest, substantially as specified.

FREDERICK W. HEDGELAND.

Witnesses:
 EDW. S. EVARTS,
 H. M. MUNDAY.